United States Patent [19]

Takahashi et al.

[11] Patent Number: 5,536,799
[45] Date of Patent: Jul. 16, 1996

[54] CYANOCRYLATE ADHESIVE COMPOSITION

[75] Inventors: Shin Takahashi; Asako Kaai; Toshio Okuyama, all of Nagoya, Japan

[73] Assignee: Toagosei Co., Ltd., Tokyo, Japan

[21] Appl. No.: 416,881

[22] PCT Filed: Nov. 9, 1993

[86] PCT No.: PCT/JP93/01619

§ 371 Date: Apr. 20, 1995

§ 102(e) Date: Apr. 20, 1995

[87] PCT Pub. No.: WO94/11454

PCT Pub. Date: May 26, 1994

[30] Foreign Application Priority Data

Nov. 9, 1992 [JP] Japan ..................... 4-323638

[51] Int. Cl.$^6$ ................................................. C08F 220/50
[52] U.S. Cl. ........................................ 526/298; 428/520
[58] Field of Search ............................................. 526/298

[56] References Cited

U.S. PATENT DOCUMENTS

| | | | |
|---|---|---|---|
| 3,551,311 | 12/1970 | Nass et al. | 428/458 |
| 3,940,362 | 2/1976 | Overhults | 523/116 |
| 5,367,002 | 11/1994 | Huang et al. | 523/116 |

FOREIGN PATENT DOCUMENTS

| | | |
|---|---|---|
| 51-5391 | 7/1976 | Japan . |
| 63-128089 | 5/1988 | Japan . |
| 5695966 | 8/1991 | Japan . |

*Primary Examiner*—Mark Nagumo
*Attorney, Agent, or Firm*—Cushman Darby & Cushman

[57] ABSTRACT

A cyanoacrylate adhesive composition, which contains esters in which an alcohol residue thereof includes a dipentaerythritol residue and an acid residue thereof is an acrylic or methacrylic acid residue, and which composition is improved in adhesion performance under high temperature and humid conditions, namely moisture and thermal resistance. The cyanoacrylate adhesive composition according to the present invention has excellent moisture and thermal resistance and thus is more widely usable than conventional ones in various industries, medical field, and leisure activity as well as household application and pupils' stationary.

17 Claims, No Drawings

CYANOCRYLATE ADHESIVE COMPOSITION

TECHNICAL FIELD

The present invention relates to a cyanoacrylate adhesive composition which is improved in adhesion function under conditions of high temperature and high humidity, namely resistance to heat and moisture. It is utilized widely in the adhesive industry and various industries using adhesives.

BACKGROUND ART

Cyanoacrylate adhesives, which contain 2-cyanoacrylate as a major component, have been favorably used as an instantaneous adhesive in wide variety of industries, medical field, leisure activity and household since 2-cyanoacrylate as the major component has the property of easily polymerizing anionically in the presence of a trace amount of moisture and basic substances to quickly cure.

While cyanoacrylate adhesives have excellent moisture and thermal resistance on adherends of rigid PVC, ABS or the like, they are poor in moisture and thermal resistance upon application to materials of nitrogen-containing compounds or sulfur-containing compounds such as chloroprene rubber, EPDM and other synthetic rubbers and Bakelite.

A reason for the poor moisture and thermal resistance in adhesion of cyanoacrylate adhesives to chloroprene rubber, EPDM and other synthetic rubbers and to Bakelite would be that humidity and/or heat promote the nitrogen-containing compounds or sulfur-containing compounds to bleed from these materials and accumulate on the adhesion interface resulting in reduction of adhesion strength and that the bled compounds promote decomposition of cyanoacrylate polymers.

The moisture and thermal resistance of the adhesives is further deteriorated when they are used to bond synthetic rubbers such as chloroprene rubber and EPDM in a state where internal residual stress exists.

The reason is understood as follows:

Hardened bodies of cyanoacrylate adhesives are stiff and are poor in a function of relaxing the internal stress. Thus, it is considered that the effect of stress on adhesion interface and adhesion layer becomes significant, and as a result, deterioration of adhesion caused by humidity and/or temperature is promoted.

Because of these reasons, urethane adhesives, epoxy adhesives, acryl adhesives and the like have been used in the industry for adhesion to sites where durability is required, while hot melt adhesives, pressure-sensitive adhesives and the like have been used for adhesion to sites where flexibility is required.

However, urethane adhesives, epoxy adhesives, acryl adhesives and the like have disadvantages that they are "poor in operability due to requirements of blending of two packages or primer pretreatment of the surfaces to be adhered" and "poor in productivity due to slow adhesion rate." On the other hand, hot melt adhesives and pressure-sensitive adhesives have a disadvantage that they are "poor in durability." In the industry, thus there is a strong demand for development of an adhesive that is excellent in durability and brings about improvement in operability and productivity.

Cyanoacrylate adhesives, which are characterized by single package instantaneous adhesion, may bring about the above-mentioned improvement in operability and productivity, however are poor in durability and flexibility (stress relaxation) as already explained.

For the purpose of providing flexibility with cyanoacrylate adhesives, a known technology is to blend a phthalate, a sebacate, and a saturated copolymer polyester described in JP-A-63-284279.

However, these softening materials adversely affect moisture and thermal resistance since they are present in cyanoacrylate polymers just in dispersed state.

JP-A-58-185666 is another known technology for providing flexibility, which discloses blending a $C_1$–$C_4$ alkyl (meth)acrylate or a $C_1$–$C_4$ alkoxyalkyl (meth)acrylate. These (meth)acrylates not only exist in cyanoacrylate polymers in dispersed state but also have a possibility of improving durability by radical polymerization at elevated temperature.

In the adhesion to chloroprene rubber which contains nitrogen-containing compounds or sulfur-containing compounds, however, the compositions blended with the $C_1$–$C_4$ alkyl (meth)acrylate or the $C_1$–$C_4$ alkoxyalkyl (meth)acrylate described in JP-A-58-185666 can not still satisfy the moisture and thermal resistance.

Under such situations, there is a strong need for developing an instantaneous adhesive-that is excellent in moisture and thermal resistance even on materials said to be difficult to bond, that is, materials that contain nitrogen-containing compounds or sulfur-containing compounds, for example, synthetic rubbers like chloroprene rubber and EPDM, and Bakelite.

The present invention is to provide a cyanoacrylate instantaneous adhesive that has excellent moisture and thermal resistance when applied for adhesion particularly to adherends that contain nitrogen-containing compounds or sulfur-containing compounds, for example, synthetic rubbers like chloroprene rubber and EPDM, and Bakelite.

DISCLOSURE OF INVENTION

As a result of intensive studies for solving the above mentioned problems, the present inventors have found that a composition obtained by adding a specific acrylate or methacrylate to 2-cyanoacrylate, can be an adhesive composition exhibiting excellent moisture and thermal resistance, and have completed the present invention.

The present invention relates to a cyanoacrylate adhesive composition characterized in that it comprises an ester the alcohol residue of which contains a dipentaerythritol residue and the acid residue of which is an acrylic or methacrylic acid residue.

Now, the adhesive composition according to the present invention is explained.

As 2-cyanoacrylate, which is the main component exhibiting adhesion function in the present composition, may be widely adopted what has been used as a main component of cyanoacrylate instantaneous adhesives; examples of the 2-cyanoacrylate are listed below:

That is to say, 2-cyanoacrylic acid esters of methyl, ethyl, n-propyl, i-propyl, propargyl, n-butyl, i-butyl, n-pentyl, n-hexyl, 2-ethylhexyl , n-octyl, n-nonyl, oxononyl, n-decyl, n-dodecyl, allyl, ethynyl, 2-butenyl, cyclohexyl, phenyl, phenethyl, tetrahydrofurfuryl, chloroethyl, 2,2,2-trifluoroethyl, hexafluoroisopropyl, methoxyethyl, ethoxyethyl, propoxyethyl, isopropoxyethyl, butoxyethyl, hexyloxyethyl, 2-ethyl hexyloxyethyl, butoxyethoxyethyl, hexyloxyethoxyethyl, 2-ethyl hexyloxyethoxyethyl, methoxypropyl, methoxypropoxypropyl, methoxypropoxypropoxypropyl, ethoxypropyl, ethoxypropoxypropyl, or the like, but not limited thereto.

Preferable 2-cyanoacrylates for use in the present invention are ethyl 2-cyanoacrylate, methoxyethyl 2-cyanoacrylate and ethoxyethyl 2-cyanoacrylate.

The present ester that has a dipentaerythritol residue as an alcohol residue and has an acrylic acid or mathacrylic acid residue as an acid residue, includes esters of dipentaerythritol with acrylic acid or mathacrylic acid, or esters of a modified alcohol with acrylic acid or mathacrylic acid in which said modified alcohol is a dipentaerythritol modified by addition of a lactone such as caprolactone to dipentaerythritol. Specific examples of these esters include, but are not limited to, dipentaerythritoltriacrylate (commercially available from Nippon Kayaku Co., Ltd. as KAYARAD D-330), dipentaerythritoltetraacrylate (commercially available from Nippon Kayaku Co., Ltd. as KAYARAD D-320), dipentaerythritolpentaacrylate (commercially available from Nippon Kayaku Co., Ltd. as KAYARAD D-310), dipentaerythritolhexaacrylate (commercially available from Nippon Kayaku Co., Ltd. as KAYARAD DPHA), and modified dipentaerythritolhexaacrylates in which dipentaerythritol is modified with caprolactone (commercially available from Nippon Kayaku Co., Ltd. as KAYARAD DPCA-20, KAYARAD DPCA-30, KAYARAD DPCA-60, and KAYARAD DPCA-120).

Preferable esters among the ones listed above are dipentaerythritoltriacrylate (available from Nippon Kayaku Co., Ltd. as KAYARAD D-330), dipentaerythritoltetraacrylate (available from Nippon Kayaku Co., Ltd. as KAYARAD D-320), dipentaerythritolpentaacrylate (available from Nippon Kayaku Co., Ltd. as KAYARAD D-310) and dipentaerythritolhexaacrylate (available from Nippon Kayaku Co., Ltd. as KAYARAD DPHA).

The amount of the present ester to be blended with 2-cyanoacrylate is preferably 1 through 50% by weight, more preferably 10 through 40% by weight, based on the total of the ester and 2-cyanoacrylate. When the blending amount of the ester is lower than 1% by weight, sufficient durability will not be obtained. When it is more than 50% by weight, poor hardening and lowering of the adhesive strength will be caused.

Stabilizers, polymerization accelerators, thickeners and other additives shown below may be appropriately incorporated as optional ingredients into the cyanoacrylate adhesive in ordinary manner.

STABILIZER

Hydroquinone, sulfurous acid gas or others may be added as a polymerization inhibitor for improving storage stability.

POLYMERIZATION ACCELERATOR AND INITIATOR

A polyalkylene oxide or its derivative, crown ether or its derivative, silacrown ether or its derivative, calixarene derivative, or others may be added as an anionic polymerization accelerator for improving adhesion rate. An organic peroxide such as a hydroperoxide, peroxy ester, ketone peroxide, peroxyketal, dialkyl peroxide, diacyl peroxide, peroxydicarbonate or others may be added as a radical initiator.

THICKENER

2-Cyanoacrylate monomer is essentially colorless and transparent liquid of low viscosity; this liquid can be made viscous or thixotropic by dissolution or dispersion of a homopolymer or copolymer of various kinds of (meth)acrylates, or acrylic rubber, cellulose derivative, silica or others.

OTHER ADDITIVES

Other additives such as a dye, pigment, plasticizer, diluent and others may be blended.

BEST MODE FOR CARRYING OUT THE INVENTION

Hereinafter, the present invention will be explained in more details by way of examples and comparative examples. However, the present invention is not limited to these examples.

EXAMPLES 1 THROUGH 16

COMPARATIVE EXAMPLES 1 THROUGH 5

Adhesives having the compositions shown in Table 1 were prepared, and their characteristics were evaluated as follows. Meanwhile, KAYARAD DPCA-20 and KAYARAD DPCA-30 in Table 1 are modified dipentaerythritolhexaacrylates made by Nippon Kayaku Co., Ltd.

Moisture and thermal resistance on chloroprene rubber:

Chloroprene rubber was selected as the material to be adhered. The moisture and thermal resistance of the compositions shown in Table 1 upon adhesion to chloroprene rubber was determined by the following procedures:

Preparation of test pieces (1) Pieces of chloroprene rubber with the size of 3 mm (thickness)×25 mm (width)×100 nun (length) were prepared according to JIS K6850.

Bond of test pieces (2) Test pieces were bonded together with an overlap of 12.5 mm in width. Pressure was given by fingers until setting.

(3) Furthermore, a 500 g load was given for 24 hour for aging adhesion.

Environmental test (4) Test pieces bonded by the above procedures (1) through (3) were exposed to a thermo-hydrostat environment at 70° C. under 95% RH for 72 hours.

Measurement of adhesion strength (5) The adhesion strength under tensile shear of the test pieces bonded by the above procedures (1) through (3) was measured at room temperature according to JIS* K6850. The values measured were listed as initial strength in Table 1.

(6) The test pieces subjected to the above procedure (4) were cooled down to room temperature and measured for adhesion strength under tensile shear at room temperature according to JIS K6850. The values measured were listed in Table 1 as strength after the moisture and thermal resistance test. The mark * in Table 1 shows that the test piece was broken.

The moisture and thermal resistance of each adhesive composition was evaluated by the initial strength and the 10 strength after the moisture and thermal resistance test, measured by the above procedures. Evaluation showed that the adhesive compositions of the present invention are quite superior to the comparative ones. That is, the present compositions maintain the strength to the extent that adherends are broken or almost broken even after the test for moisture and thermal resistance upon application to chloroprene, and thus are understood to be excellent in resistance to moisture and heat.

TABLE 1

| | Composition | | | | Tensile shearing adhesion strength of CR (kgf/cm2) | |
|---|---|---|---|---|---|---|
| | 2-Cyano acrylate (Blended weight %) | | Ester (Blended weight %) | | Initial | Moisture and thermal resistance |
| Ex. 1 | Ethyl | (80) | DPE triACR | (20) | 8.0* | 8.0* |
| Ex. 2 | Ethyl | (70) | DPE triACR | (30) | 8.0* | 8.0* |
| Ex. 3 | Ethyl | (80) | DPE pentaACR | (20) | 8.0* | 8.0* |
| Ex. 4 | Ethyl | (80) | DPE hexaACR | (20) | 8.0* | 8.0* |
| Ex. 5 | Ethyl | (85) | DPE hexaACR | (15) | 8.0* | 8.0* |
| Ex. 6 | Ethyl | (90) | DPE hexaACR | (10) | 8.0* | 8.0* |
| Ex. 7 | Ethyl | (60) | DPE hexaACR | (40) | 8.0* | 8.0* |
| Ex. 8 | Ethyl | (80) | KAYARAD DPCA-20 | (20) | 8.0* | 8.0* |
| Ex. 9 | Ethyl | (80) | KAYARAD DPCA-30 | (20) | 8.0* | 8.0* |
| Ex. 10 | Ethoxy-ethyl | (80) | DPE pentaACR | (20) | 8.0* | 7.2 |
| Ex. 11 | Ethoxy-ethyl Ethyl | (60) (20) | DPE hexaACR | (20) | 8.0* | 8.0* |
| Ex. 12 | Ethoxy-ethyl Ethyl | (50) (30) | DPE hexaACR | (20) | 8.0* | 6.9 |
| Ex. 13 | Ethoxy-ethyl Ethyl | (40) (40) | DPE hexaACR | (20) | 8.0* | 8.0* |
| Ex. 14 | Ethoxy-ethyl Ethyl | (50) (20) | DPE hexaACR | (30) | 8.0* | 8.0* |
| Ex. 15 | Methoxy-ethyl Isobutyl | (60) (20) | DPE hexaACR | (20) | 8.0* | 7.1 |
| Ex. 16 | Ethoxy-ethyl Isopropyl | (60) (20) | DPE hexaACR | (20) | 8.0* | 7.3 |
| Cpr. Ex. 1 | Ethyl | (100) | — | | 8.0* | 3.2 |
| Cpr. Ex. 2 | Ethoxy-ethyl | (100) | — | | 8.0* | 1.0 |
| Cpr. Ex. 3 | Ethyl | (80) | IsobutylACR | (20) | 8.0* | 2.2 |
| Cpr. Ex. 4 | Ethyl | (80) | TEGDA | (20) | 8.0* | 2.6 |
| Cpr. Ex. 5 | Ethyl | (80) | TMPTA | (20) | 8.0* | 4.0 |

Ex.: Example, Cpr. Ex.: Comparative Example
DPE: Dipentaerythritol, ACR: acrylate, TEGDA: Tetraethyleneglycol diacrylate, TMPTA: Trimethylolpropane triacrylate Moisture and thermal resistance under condition of internal stress:

EPDM and soft flexible PVC were selected as the materials to be adhered. The moisture and thermal resistance under application of internal stress was determined by the following procedures:

Preparation of test pieces
(1) Pieces of EPDM with the size of 3 mm (thickness)×15 through 17 mm (width)×110 mm (length) were prepared.
(2) Pieces of soft flexible PVC with the size of 3 mm (thickness)×15 through 17 mm (width)×100 mm (length) were prepared.

Bond of test pieces (3) An EPDM piece of (1) above was pulled in longitudinal direction by 10 mm to make its length 120 mm, and fixed to apply stress thereto.
(4) The EPDM piece of (3) above and a soft flexible PVC piece of (2) above were bonded together with an overlap of 100 mm in width. They were backed with strips of wood and pressed by fingers for 20 seconds until setting.
(5) After pressure was released, the adhesion was aged for 24 hour.

Environmental test (6) Test pieces bonded by the above procedures (1) through (5) were exposed to a thermo-hydrostat environment at 70° C. under 95% RH for 72 hours.

Measurement of adhesive strength (7) The test pieces bonded by the above procedures (1) through (5) were peeled by hands at an angle of 180° under room temperature. The extent of material fracture of the rubber was judged by visual observation and listed ill Table 2.

(8) Test pieces exposed to the above environmental test of above (6) were cooled down to room temperature. The extent of material fracture of the rubber was judged by visual observation in a manner similar to (7) above and listed in Table 2.

The moisture and thermal resistance of each adhesive composition under application of internal stress was evaluated by the initial material fracture extent and the material fracture extent after the moisture and thermal resistance test, respectively determined by the above procedures. The evaluation showed that the adhesive compositions of the present invention are quite superior in moisture and thermal resistance to the comparative ones. That is, the present compositions show the high adhesion material fracture extent of 80–90 % even after the moisture and thermal resistance test upon application to soft flexible PVC with internal stress, and thus are understood to be excellent in moisture and thermal resistance and stress relaxation.

TABLE 2

EPDM fracture extent (%) in tests for peeling adhesion of EPDM to soft flexible PVC

|  | Initial | Moisture and thermal resistance |
| --- | --- | --- |
| Example 1 | 80–90 | 80–90 |
| Example 2 | 60–90 | 80–90 |
| Example 3 | 80–90 | 80–90 |
| Example 4 | 80–90 | 80–90 |
| Example 5 | 80–90 | 80–90 |
| Comparative Example 1 | 100 | 10–20 |

INDUSTRIAL APPLICABILITY

The cyanoacrylate adhesive composition according to the present invention has excellent moisture and thermal resistance. This instantaneous adhesive will be more widely used in various applications than conventional ones. Greater contribution is expected to various industries, medical field, and leisure activity as well as household use and pupils' stationary.

We claim:

1. A cyanoacrylate adhesive composition which comprises (a) a cyanoacrylate and (b) at least one di- or higher functional ester having an alcohol residue and having an acid residue, said alcohol residue comprising a residue of dipentaerythritol, and said acid residue is a residue of an acrylic or methacrylic acid.

2. A cyanoacrylate adhesive composition according to claim 1, wherein the amount of (b) is 1–50% by weight based on the total of (a) and (b).

3. A cyanoacrylate adhesive composition according to claim 1, wherein (b) is present in an amount of 1–40% by weight based on the total of (a) and (b).

4. A cyanoacrylate adhesive composition which comprises a cyanoacrylate and tri- or higher acrylates or methacrylates which contain an alcohol residue of a dipentaerythritol.

5. A cyanoacrylate adhesive composition according to claim 4, wherein the amount of said acrylates and methacrylates is 1–50% by weight based on the total of the acrylates and methacrylates and the cyanoacrylate.

6. A cyanoacrylate adhesive composition according to claim 4, wherein the amount of said acrylates and methacrylates is 10–40% by weight based on the total of the acrylates and methacrylates and the cyanoacrylate.

7. A cyanoacrylate adhesive composition according to claim 4, wherein said composition comprises said cyanoacrylate and said tri- or higher acrylates.

8. A cyanoacrylate adhesive composition according to claim 4, wherein said acrylates are the esters of a dipentaerythritol or a modified dipentaerythritol with an acrylic acid.

9. A cyanoacrylate adhesive composition according to claim 4, wherein said methacrylates are the esters of a dipentaerythritol or a modified dipentaerythritol with an methacrylic acid.

10. A cyanoacrylate adhesive composition which comprises (a) a 2-cyanoacrylate and (b) at least one of (i) an ester of a dipentaerythritol with an acrylic acid or a methacrylic acid, (ii) an ester of a modified alcohol with an acrylic acid or a methacrylic acid, wherein said modified alcohol is a dipentaerythritol modified by addition of a lactone, and (iii) a combination of an ester of a dipentaerythritol with an acrylic acid or a methacrylic acid and an ester of said modified alcohol with an acrylic acid or a methacrylic acid.

11. A cyanoacrylate adhesive composition according to claim 10, wherein said 2-cyanoacrylate is at least one member selected from the group consisting of ethyl 2-cyanoacrylate, methoxyethyl 2-cyanoacrylate and ethoxyethyl 2-cyanoacrylate.

12. A cyanoacrylate adhesive composition according to claim 10, wherein said (b) is at least one selected from the group consisting of dipentaerythritol triacrylate, dipentaerythritol tetraacrylate, dipentaerythritol pentaacrylate and dipentaerythritol hexaacrylate.

13. A cyanoacrylate adhesive composition according to claim 10, wherein said (b) is a modified dipentaerythritol hexaacrylate which is obtained by modifying dipentaerythritol with caprolactone.

14. A cyanoacrylate adhesive composition according to claim 10, wherein the amount of (b) is 1–50% by weight based on the total of (a) and (b).

15. A cyanoacrylate adhesive composition according to claim 13, wherein (b) is present in an amount of 1–40% by weight based on the total of (a) and (b).

16. A cyanoacrylate adhesive composition according to claim 10, wherein said 2-cyanoacrylate is at least one member selected from the group consisting of ethyl 2-cyanoacrylate, methoxyethyl 2-cyanoacrylate and ethoxyethyl 2-cyanoacrylate, and said (b) is at least one selected from the group consisting of dipentaerythritol triacrylate, dipentaerythritol tetraacrylate, dipentaerythritol pentaacrylate and dipentaerythritol hexaacrylate.

17. A cyanoacrylate adhesive composition according to claim 16, wherein the amount of (b) is 1–50% by weight based on the total of (a) and (b).

* * * * *